United States Patent [19]

Pfalzer

[11] 4,214,982
[45] Jul. 29, 1980

[54] PROCESS AND DEVICE FOR REMOVING PRINTER'S INK FROM A FIBER SUSPENSION

[75] Inventor: Lothar Pfalzer, Heidenheim, Fed. Rep. of Germany

[73] Assignee: J. M. Voith GmbH, Heidenheim, Fed. Rep. of Germany

[21] Appl. No.: 935,259

[22] Filed: Aug. 21, 1978

[30] Foreign Application Priority Data

Aug. 27, 1977 [DE] Fed. Rep. of Germany ....... 2738782

[51] Int. Cl.² .......................... B03D 1/02; B03D 1/14
[52] U.S. Cl. ..................................... 209/164; 209/168; 209/211; 261/123; 261/DIG. 75
[58] Field of Search ............... 209/166, 164, 165, 170, 209/211, 168; 162/4, 5; 261/DIG. 75, 123

[56] References Cited

U.S. PATENT DOCUMENTS

| | | | |
|---|---|---|---|
| 1,518,010 | 12/1924 | Simpson | 209/170 |
| 2,917,173 | 12/1959 | Rakowsky | 209/211 X |
| 3,050,188 | 8/1962 | Nisser et al. | 209/170 |
| 3,226,201 | 12/1965 | Harmon | 261/DIG. 75 X |
| 3,446,353 | 5/1969 | Davis | 209/170 X |
| 3,557,956 | 1/1971 | Braun et al. | 162/4 X |
| 3,696,934 | 10/1972 | Oisi | 209/111 X |
| 3,759,385 | 9/1973 | Pouillon | 209/165 |
| 3,799,511 | 3/1974 | Svantesson | 261/DIG. 75 X |
| 4,013,505 | 3/1977 | Balcar et al. | 162/5 |

FOREIGN PATENT DOCUMENTS

| | | | |
|---|---|---|---|
| 68078 | 3/1915 | Austria | 209/168 |
| 328031 | 10/1920 | Fed. Rep. of Germany | 209/170 |

*Primary Examiner*—Ralph J. Hill
*Attorney, Agent, or Firm*—Ostrolenk, Faber, Gerb & Soffen

[57] ABSTRACT

Method and apparatus for separating ink from pulped inked paper: a suspension of pulped paper and chemicals enters a cylindrical container tangentially near the container bottom and rotates around the interior of the container; the ink and chemicals form a foam that floats off the suspension of paper fibers; the suspension exits from the container tangentially near the container top; a funnel at the top of the container; a foam outlet near the axis of the container from the funnel; a vortex generator at the bottom of the container, which blows upwardly creating a vortex in the suspension; means disperse air in the suspension in the container inlet before the suspension enters the container through the container inlet; the dispersing means either comprises a rotor cooperating with a stator, or comprises deflector plates in the container inlet; air is supplied to the inlet at the dispersion means rotor or deflector plates; the deflector plates may be washed clean.

22 Claims, 5 Drawing Figures

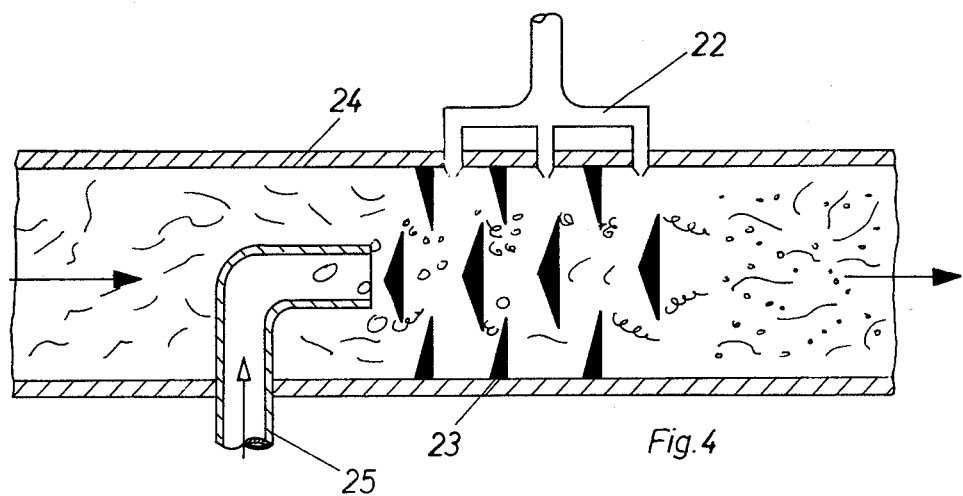

PROCESS AND DEVICE FOR REMOVING PRINTER'S INK FROM A FIBER SUSPENSION

The invention relates to a process and to an apparatus for removing printer's ink from a fiber suspension comprised of used paper wherein the process comprises adding chemicals and air to the suspension and then floating off a foam of the ink and chemical materials.

BACKGROUND OF THE INVENTION

Conventionally, de-inking of fiber suspensions of used paper is performed in so-called flotation cells, in which air is supplied naturally or is forced into the suspension in such a way that an intimate mixture of air and suspension occurs and dispersion of the air through the suspension results. The subsequent separation of air, together with the collectors and carriers, to which the printing ink particles adhere, from the suspension occurs as a result of the buoyancy of the collectors and carriers which form a foam. The foam in which the printing ink particles are carried floats and is then skimmed from the open vessel off the surface of the suspension. The drawback of this process is that under optimal conditions, the flotation cells can operate only at material densities of about 1%. Higher material densities decrease the effectiveness of the process performed in these cells. Furthermore, the power consumption of the conventional process is relatively high.

SUMMARY OF THE INVENTION

The primary object of the invention is to provide a de-inking process of high efficiency.

It is another object of the invention to be able to de-ink suspensions of relatively higher densities.

It is yet another object of the invention to effectively and rapidly separate impurities from a fiber suspension of liquified paper.

This is accomplished according to the invention by flowing the suspension through a rotation-symmetrical container in rotational motion and by the flotation foam being discharged from the container in the area of the axis of rotation thereof.

Not only is the usual floating buoyancy of the foam of chemicals and ink used, but the radial pressure gradient and the effects of centrifugal and resisting forces, which are present in the whirling flow, are also used. This at the same time produces a low pressure gradient between the entrance and exit of the flotation vessel, which, in turn, has a favorable effect on power consumption.

The combined application of different fields of force, plus, possibly, a separate, highly effective dispersion, allows the flotation process to be performed with material densities of about 2%. Thus, fewer devices are required for cleaning any specified quantity of material. Either plant space requirements may be reduced, or more fiber material can be cleaned in a plant of the same size. As a further advantage, air can be supplied in a controlled manner. Moreover, the process is very simple. The process can also be carried out in a closed system. Thus, the environment would not be disturbed by odor or spray water.

A device for implementing the process according to the invention comprises a rotation symmetrical container preferably in the form of an upright cylinder, with an inlet relatively nearer to one end wall of the cylinder, an outlet for the cleaned fiber suspension relatively nearer to the other end wall, and a foam outlet in the area of the upper cylinder axis. In one embodiment of the invention, the inlet opens tangentially into the cylinder.

Effective separation of the fibers from the dyestuffs is accomplished by arranging the outlet for deinked fiber suspension to extend laterally from the upper area of the cylinder.

In a further development of the invention, the upper area of the cylinder is funnel-shaped and the foam outlet is arranged there. The funnel acts as a centering device for the foam and thereby increases the separation effect.

In a further development, a propeller or rotor is placed in the lower area of the cylinder coaxially with the cylinder.

Formation of a vortex at the center of the cylinder is further intensified according to the invention by providing the lower end wall of the container, in the area of the cylinder axis, with an upwardly tapering cone. A liquid conduit opens into the interior of the cone. Liquid introduced into this area causes an upwardly directed rotary flow. The liquid for this purpose may be either clear water or a part of the fiber suspension that must be cleaned. It is of advantage if an air conduit also opens into the interior.

Highly effective and intensive mixing of air and fiber suspension is accomplished if dispersion means for effectively dispersing and mixing air throughout the suspension are arranged in the inlet line to the cylinder. This means includes an air feed line which delivers air to an area of the inlet line in which the elements that cause the dispersion of air are arranged.

In one embodiment, the dispersion means may comprise a rotor, into whose area the inlet lines for the suspension and for the air open, and a stator designed as a filter, beyond which the outlet line for the suspension mixed with air is located.

Preferably, the dispersion means is provided with an outlet for impurities, which is arranged ahead or upstream of the filter. This helps eliminate disturbing impurities from the liquified suspension prior to the flotation. Any light-weight impurities such as plastic materials passing through the filter can also be removed by the rotational motion of the suspension in the container itself through the foam outlet.

Static disperson elements without any moving parts comprise another embodiment of dispersion means. These comprise an arrangement of deflector plates and edges. Air that flows along with the suspension over the plates and off their edges is broken up into fine bubbles and is intimately mixed with the fiber suspension. In a modified embodiment, the deflector elements are comprised of perforated plates. A further possibility is to equip the deflector elements with a plurality of deflector plates which are arranged across the flow direction.

An arrangement of spray tubes for spraying water, or the like may be positioned in the area of the deflector elements. The spray keeps the deflector elements free from deposits.

BRIEF DESCRIPTION OF THE DRAWINGS

Other objects and features of the invention are described below, with reference to the accompanying drawings, in which:

FIG. 3 is a section through another dispersion means according to the invention;

FIG. 4 is a section through a third dispersion means according to the invention.

DESCRIPTION OF THE PREFERRED EMBODIMENTS

Figure 1:
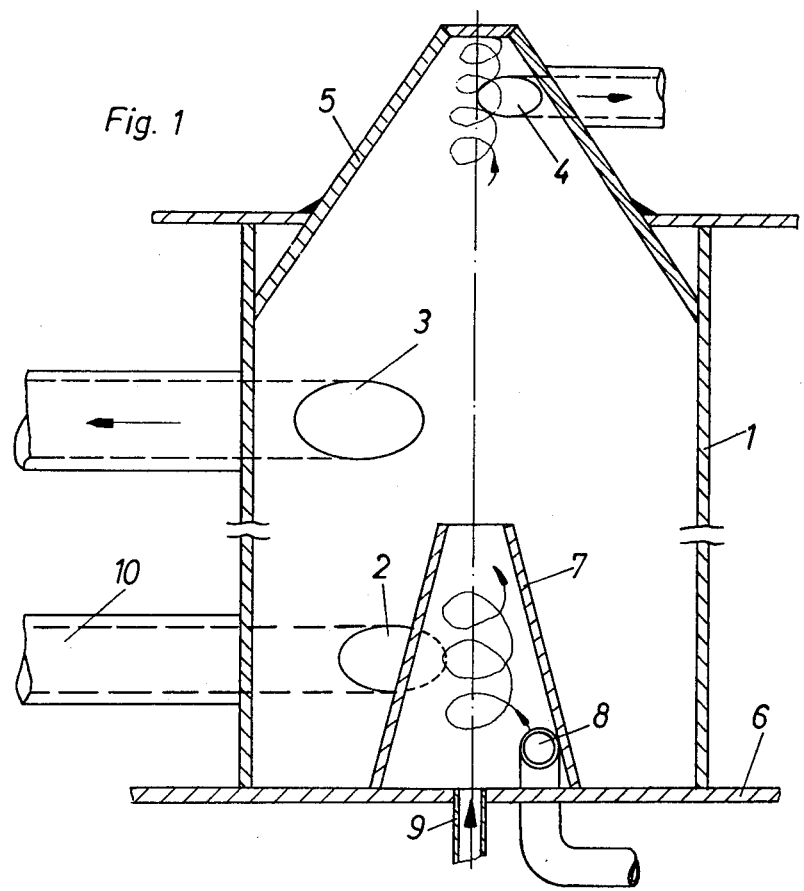
FIG. 1 is a longitudinal section through a device according to the invention in which the process according to the invention is practiced.

The device according to the invention comprises an upright cylinder 1. A suspension comprised of liquified or pulped paper that has been imprinted with ink and which liquified paper is combined with known chemicals and carriers for floating ink out of the suspension, is mixed with air and is then supplied laterally into the cylinder 1 via an inlet 2, which is oriented to emit the mixed suspension and air into the cylinder in a generally tangential direction. The inlet 2 is above, but relatively nearer to, the lower wall 6 of the cylinder. The suspension of paper material, with the ink and the collectors therefor removed, is discharged laterally at the upper area of cylinder 1 via an outlet 3. The outlet is also oriented to remove the material from the cylinder in a generally tangential direction. The outlet 3 is below, but relatively nearer to, the top section 5 of the cylinder 1. The relative vertical positions of the inlet and the outlet might be reversed, but the illustrated arrangement is preferred.

Only the flotation foam carrying the removed ink is extracted centrally upward through a foam outlet 4, which is located in the side wall of funnel-shaped top section 5 of the cylinder 1. The outlet 4 is also oriented to withdrawn foam in a direction generally tangential to the funnel. Because of this arrangement, no negative effects are produced by a breakout of the vortex core. At the same time, this arrangement enables the handling of large volumes of air at only low shearing forces. The end material outlet 3 is always free of air.

A core 7 projects upwardly from the lower end wall 6 of cylinder 1. A liquid conduit 8 and an air conduit 9 both open into the interior of cone 7. The liquid conduit 8 opens in a direction that is generally tangential to the cone 7 so that the vortex core is stabilized. Due to the narrowing of the cone, the supplied liquid volume is greatly accelerated up to its exit from the cone and it enters the interior of the cylinder 1 at a high rotational velocity. This effect is intensified by the air flow via air conduit 9 which enters cone 7 at its central axis through lower end wall 6.

Figure 5:
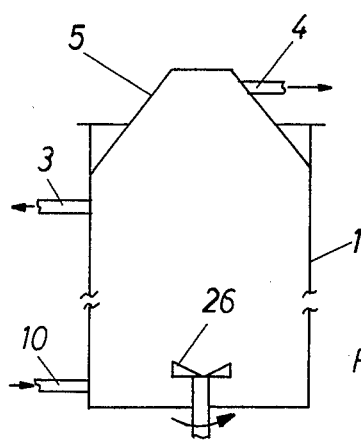
FIG. 5 is a longitudinal section through an alternate embodiment of a device according to the invention.

In a modification of this (FIG. 5), a propeller or rotor 26 is placed coaxially in the container at the bottom thereof for generating the upward vortex. The cone 7, liquid conduit 8 and air conduit 9 could be eliminated.

Figure 2:
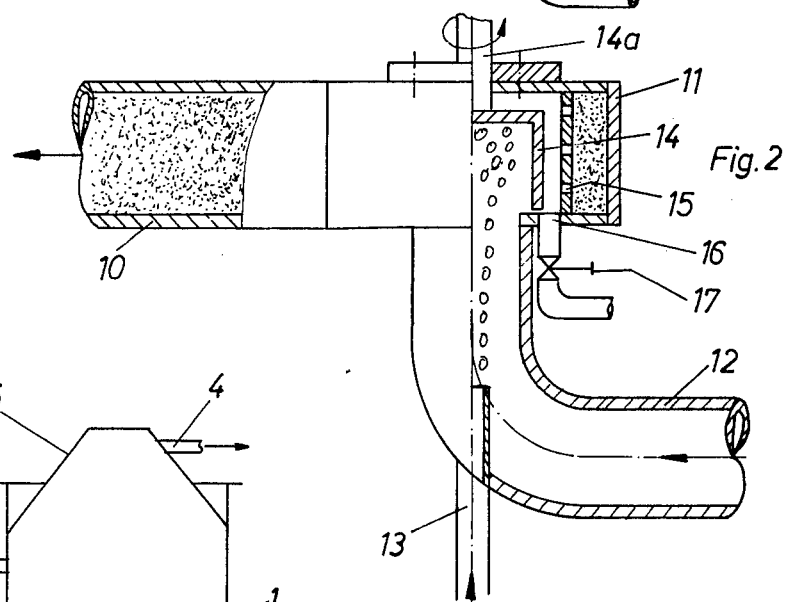
FIG. 2 is a section through one dispersion means according to the invention.

In the first embodiment of FIG. 2, dispersion means 11 are arranged in the inlet line 10 to cylinder 1. Means 11 are supplied with suspension through line 12 and with air through line 13. The dispersion means 11 comprises a motor-driven rotor 14 which is driven around a vertical axis in FIG. 2 by a motor (not shown) through a shaft 14*a*. A stator, designed as a filter 15 is positioned coaxially around the rotor 14. The fiber material to be mixed with air enters the dispersion means 11 tangentially via inlet line 10 toward the cylinder 1. The coarse air bubbles mixed in the fiber material are broken up by the rotating rotor 14 and the stator 15. Simultaneously, intimate blending and dispersion of air in the fiber suspension takes place.

The dispersion means also includes an outlet 16 upstream of the filter and having a blocking device 17 therein for periodic discharge of impurities retained by the filter 15.

Generally, the chemicals required for de-inking have been added already to the suspension in a preceding pulper (not shown) upstream of the dispersion means. If they are required, still further chemicals can be added directly into the dispersion means 11, the inlet line 10 or the cylinder 1 itself.

A second embodiment of dispersion means is shown in FIG. 3. It comprises a central inlet tube 18 for delivering fiber material to the dispersion means. An air supply tube 19 supplying air from a source thereof (not shown) delivers air flow into the tube 18. The tube 19 delivers air to the bottom of dispersion means 21. The means 21 is arranged in housing 20, similarly to the dispersion means of FIG. 2. The dispersion means 4 is a conically shaped, apertured, stationary filter that extends up the full height of the housing 20 and narrows upwardly. A liquid spray tube 22 communicating with a liquid supply (not shown) and with an outlet into the top of the filter 21 and aimed outwardly to spray the interior of the filter 21 eliminates deposits on the dispersion means.

A third embodiment of dispersion means is shown in FIG. 4. It comprises an installation of deflector plates 23 in a tube 24. Although a precise means for supporting the plates 23 stationary is not shown, the peripheral plates are carried on the interior of the tube and the central plates may be supported by wires (not shown) extending in from the periphery of the tube. The deflector plates are taperingly shaped on their inlet (left in FIG. 4) side to direct flow over and past the plates.

The suspension to be treated moves in the direction of the arrows. Air flows into air inlet 25, so that, as the air and suspension mixture approaches the plates, the air is divided into fine bubbles because of the pressure differences at the deflector plate edges.

In this embodiment, too, a cleaning device, spray nozzles 22, prevents clogging of the deflection plates.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A process for removing ink from a fiber suspension, which suspension was made from pulped inked paper, wherein the suspension was made by the addition of chemicals to the pulped inked paper, comprising the steps of:

introducing the suspension into a container relatively nearer to the bottom of the container; flowing the suspension rotationally around the container, for causing the ink and chemicals to form a foam that separates from the suspension;

removing the suspension, from which the foam has separated, from the container relatively nearer to the top of the container; and discharging the floating foam from the container in the vicinity of the axis of rotation of the suspension around the container and in the area of the axis of the container near the top of the container and above the removal of the suspension.

2. The process for removing ink from a fiber suspension of claim 1, wherein air is dispersed through the suspension prior to said introduction of the suspension into the container.

3. The process for removing ink from a fiber suspension of claim 1, further comprising introducing a liquid flow in a vortex starting at the bottom of the container for generating a vortex of the suspension in the container.

4. The process for removing ink from a fiber suspension of claim 3, further comprising introducing an air flow into the container from the bottom of the container near the axis of the container.

5. The process for removing ink from a fiber suspension of claim 1, wherein the suspension is introduced into the container along a direction that is tangential to the container and the suspension is removed from the container also along a direction that is tangential to the container.

6. The process for removing ink from a fiber suspension of claim 5, further comprising introducing a liquid flow in a vortex starting at the bottom of the container for generating a vortex of the suspension in the container.

7. The process for removing ink from a fiber suspension of claim 5, further comprising introducing an air flow into the container from the bottom of the container near the axis of the container.

8. Apparatus for removing ink from a fiber suspension, which suspension was made from pulped inked paper, wherein the suspension was made by the addition of chemicals to the pulped inked paper, comprising:
   an upright, substantially cylindrical container having a bottom and a top;
   a suspension inlet for the suspension and being located relatively nearer said bottom;
   a suspension outlet for the suspension and being located relatively nearer said top for withdrawal of suspension from which the foam of chemicals and ink has separated;
   a foam outlet nearer the top of said container than said suspension outlet and located in the area of the axis of said container;
   dispersion means in said suspension inlet and outside said container for dispersing air through the suspension passing through said suspension inlet; said dispersion means comprises a rotor in said suspension inlet; one inlet line for suspension and a second inlet line for air and both said inlet lines entering said suspension inlet inside said rotor;
   a stator adjacent to said rotor; said stator being in the form of a filter and said filter being placed such that beyond said stator, the suspension passes through said suspension inlet into said container;
   an impurities outlet from said suspension inlet between said rotor and said stator filter.

9. The apparatus for removing ink from a fiber suspension of claim 8, wherein said container has a funnel-like section at the top thereof; said foam outlet being from said funnel-like section.

10. The apparatus for removing ink from a fiber suspension of either of claims 8, or 9, wherein said suspension inlet enters said container laterally.

11. The apparatus for removing ink from a fiber suspension of claim 10, wherein said suspension inlet enters said container in a direction which directs flow of suspension along a direction that is tangential to said container.

12. The apparatus for removing ink from a fiber suspension of claim 10, wherein said suspension outlet leaves said container laterally.

13. The apparatus for removing ink from a fiber suspension of claim 12, wherein said suspension outlet leaves said container in a direction which receives a flow of suspension that is flowing along a direction that is tangential to said container.

14. The apparatus for removing ink from a fiber suspension of claim 13, wherein said suspension inlet enters said container in a direction which directs flow of suspension along a direction that is tangential to said container.

15. The apparatus for removing ink from a fiber suspension of either of claims 8 or 9, further comprising generating means near said container bottom for generating an upward flow of suspension and for aiding in creating a vortex in said container.

16. The apparatus for removing ink from a filter suspension of claim 15, wherein said generating means comprises a rotor arranged coaxially to the axis of said cylinder.

17. The apparatus for removing ink from a fiber suspension of claim 15, wherein said generating means comprises an upwardly narrowingly tapering cone projecting up from said container bottom in the area of the axis of said container; and
   a liquid supply conduit opening into said cone for generating an upward vortex in said cone and thereby for generating a vortex in said container.

18. The apparatus for removing ink from a fiber suspension of claim 17, further comprising an air supply conduit opening into said cone.

19. The apparatus for removing ink from a fiber suspension of claim 8, wherein said dispersion means comprises an air feed line into said suspension inlet and comprises deflector elements in said suspension inlet for deflecting flow of suspension mixed with air thereby to disperse air in the suspension.

20. The apparatus for removing ink from a fiber suspension of claim 19, wherein said deflector elements are comprised of a perforated plate.

21. The apparatus for removing ink from a fiber suspension of claim 19, wherein said deflector elements are comprised of a plurality of deflector plates supported and arranged across said suspension inlet in the flow direction of suspension through said suspension inlet.

22. The apparatus for removing ink from a fiber suspension of claim 20, further comprising spray tube means in said inlet for spraying said deflector elements.

* * * * *